United States Patent [19]

Fulton

[11] 4,003,483
[45] Jan. 18, 1977

[54] COMBINATION TAILGATE AND LOADING RAMP

[76] Inventor: Loyd R. Fulton, 24222 54th West, Mountlake Terrace, Wash. 98043

[22] Filed: July 14, 1975

[21] Appl. No.: 595,735

[52] U.S. Cl. .................................. 214/85; 296/61
[51] Int. Cl.² ........................................ B65G 67/02
[58] Field of Search ............... 214/85, 85.1, 77 P, 214/152; 296/61; 14/71, 72

[56] References Cited

UNITED STATES PATENTS

| | | | |
|---|---|---|---|
| 684,125 | 10/1901 | Strader | 296/61 |
| 3,319,811 | 5/1967 | Martin, Jr. | 214/85 |
| 3,756,440 | 9/1973 | Raap et al. | 214/85 |

Primary Examiner—Albert J. Makay
Attorney, Agent, or Firm—Seed, Berry, Vernon & Baynham

[57] ABSTRACT

A panel mounted at the rear of a truck having a flatbed which is capable of functioning as either a tailgate or a loading ramp. In the tailgate configuration, a longitudinal edge of the panel is pivotally secured across the rear edge of the truck bed. In its upright position, the panel forms an end wall enclosing the bed, and in its down position, it forms a flush, horizontal extension of the bed. The panel is placed in its loading ramp configuration by rotating one corner along a vertical axis until a side edge contacts the rear edge of the truck bed. The side edge is then pivotally secured adjacent the rear edge of the bed, with the top surface of the panel flush with the top surface of the bed.

12 Claims, 10 Drawing Figures

COMBINATION TAILGATE AND LOADING RAMP

BACKGROUND OF THE INVENTION

1. Field of the Invention

This invention relates to tailgates for trucks, and more particularly, to a tailgate easily convertible to a loading ramp.

2. Description of the Prior Art

Trucks having flatbeds partially surrounded by sidewalls are commonly used to haul heavy loads. Since the beds of these trucks are spaced a considerable distance above the ground, mechanized devices must often be used to raise heavy loads to the bed. Hydraulic or mechanical lifts placed adjacent the rear of the beds are satisfactory. However, their great expense effectively prohibits their widespread use with the most common variety of such trucks, namely, the pickup truck. Another common device used to facilitate loading of trucks is the loading ramp. Conventional loading ramps are generally carried from place to place by the truck, and their weight and bulk reduce the effective load capacity of the truck. To solve this problem, attempts have been made to utilize the rear doors of trucks as loading ramps. Examples of such devices are disclosed in U.S. Pat. No. 3,861,739, issued to Kinney, U.S. Pat. No. 2,653,845, issued to Benjamin, and Italian Pat. No. 639,021. In these devices, the doors open by pivoting on a vertical axis, and the doors are converted to ramps by pivoting the lower edges of the doors on a horizontal axis. This approach is satisfactory only for doors having a substantial height. It cannot be applied to the wide, relatively low tailgates commonly used on pickup trucks. Specifically, the height of the door must be substantially greater than the distance from the ground to the bed in order to provide a sufficiently gradual incline.

Although the prior art discloses wide and relatively low doors mounted at the rear of vehicles to pivot on either a horizontal or a vertical axis, the doors are not capable of functioning as loading ramps. Examples of such devices are found in U.S. Pat. No. 3,387,406, issued to Coker, et al., and U.S. Pat. No. 3,454,299, issued to Hewitt, et al. In neither of these devices are the doors sufficiently high to extend to the ground even if pivoted downwardly to a vertical plane.

Another approach for combining a tailgate with a loading ramp is disclosed in U.S. Pat. No. 3,756,440, issued to Raap, et al., wherein a separate loading ramp is secured to the tailgate. However, this device does not eliminate the extra weight and bulk of the loading ramp, but merely provides a convenient storage position for the ramp. Furthermore, the loading ramp does not flushly join the tailgate, thereby providing an uneven surface over which heavy objects must pass.

Still another loading ram for a pickup truck is disclosed in U.S. Pat. No. 3,642,156, issued to Stenson. Although Stenson does, in fact, utilize the tailgate as a loading ramp, the tailgate requires telescoping panels and is relatively complex and expensive.

SUMMARY OF THE INVENTION

It is an object of this invention to provide a tailgate having a longitudinal dimension substantially equal to the width of the bed and a transverse dimension substantially equal to the height of the truck bed sidewalls and which is also capable of functioning as a loading ramp having a length equal to the longest dimension of the tailgate.

It is another object of this invention to provide a tailgate that can be transformed into a loading ramp quickly and easily.

It is a further object of the invention to provide a tailgate and loading ramp combination which is far less expensive and heavy than comparable prior art devices.

These and other objects of the invention are accomplished by securing a prior bar across the rear of a flatbed truck. A panel having a width substantially equal to the width of the bed is pivotally secured to the pivot bar in either one of two positions. In the tailgate position, a longitudinal edge of the panel is secured to the pivot bar at two spaced apart fastening points, and in the loading ramp position, a transverse edge is secured to the pivot bar at two spaced apart fastening points, one of which is common to the fastening point in the tailgate position. In either position, the top edge of the panel adjacent the bed is flush with the bed surface. The panel is moved between tailgate and loading ramp positions by releasing the non-common fastening point and rotating the panel 90° about the common fastening point.

FIS. 6–8 are schematic illustrations of the unit being converted from a tailgate to a loading ramp.

Figure 9:
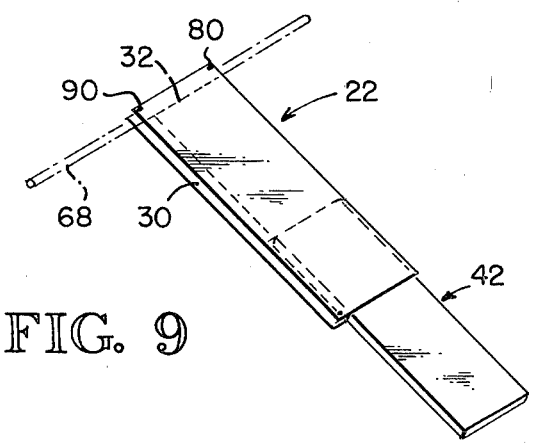

FIG. 9 is an isometric view showing an alternative embodiment of the panel unit in which an inner panel telescopes outwardly from the main panel to extend the length of the tailgate.

DETAILED DESCRIPTION OF THE DRAWINGS

Figure 1:
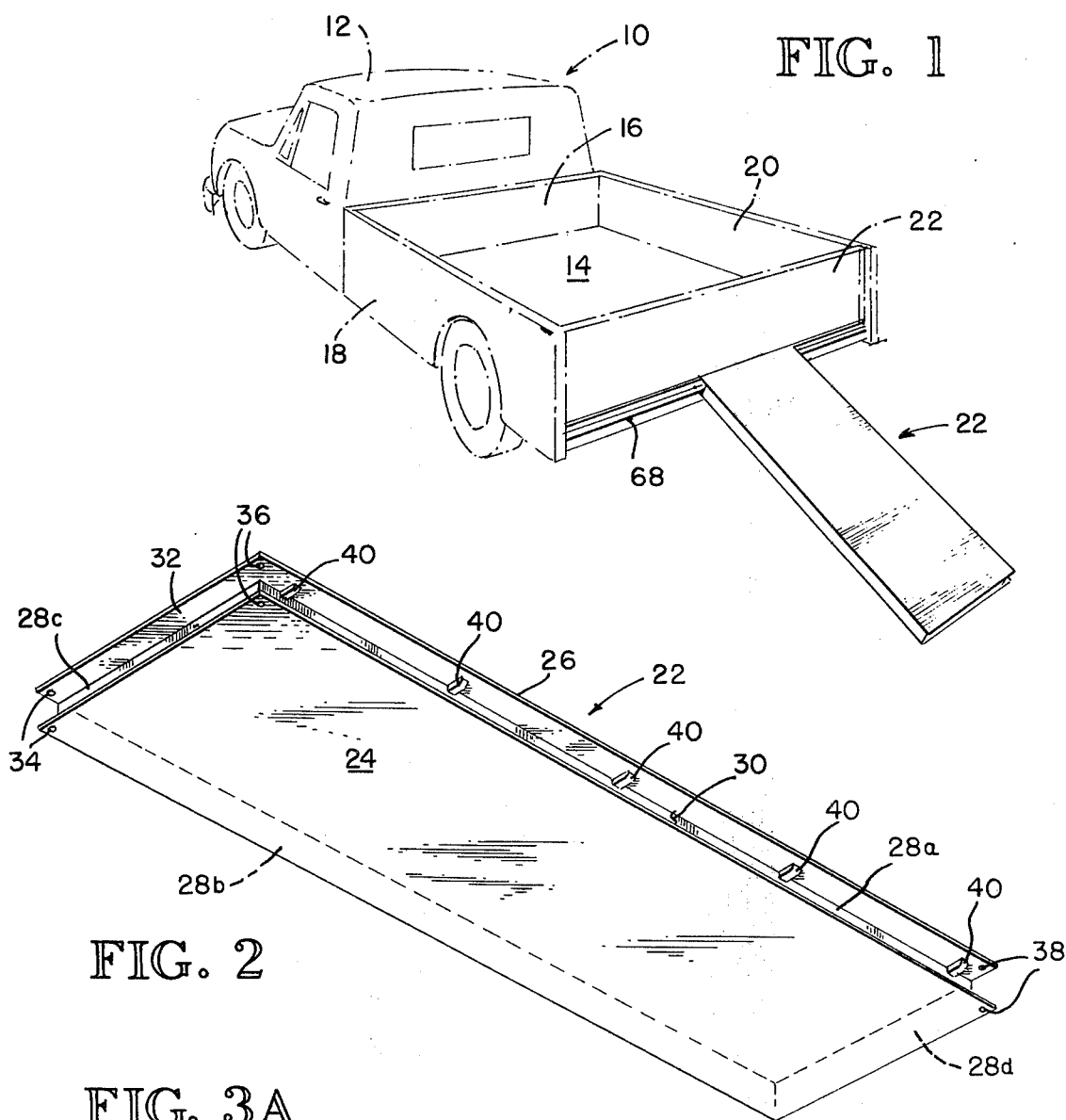
FIG. 1 is an isometric view showing the combination tailgate and loading ramp panel unit installed on a conventional pickup truck, the ramp position being shown in full lines and the raised tailgate position in phantom.

The combination tailgate and loading ramp is illustrated in use with a truck, specifically a conventional pickup truck, in FIG. 1. The truck 10 has a cab 12 enclosing the operator, a flat bed 14, a forward end wall 16 and a pair of sidewalls 18, 20. The rear end of the bed 14 terminates adjacent a panel 22, shown in phantom in the tailgate-up configuration. Conventional fastening means (not shown) are provided to secure the panel 22 to the sidewalls 18, 20 in order to maintain the panel 22 in upright position. The panel 22 may be converted to a loading ramp as shown in FIG. 1. The top end of the panel, in either the lowered tailgate or the loading ramp configuration, flushly meets the bed 14 to facilitate rolling or dragging heavy objects between the panel and the bed.

Figure 2:
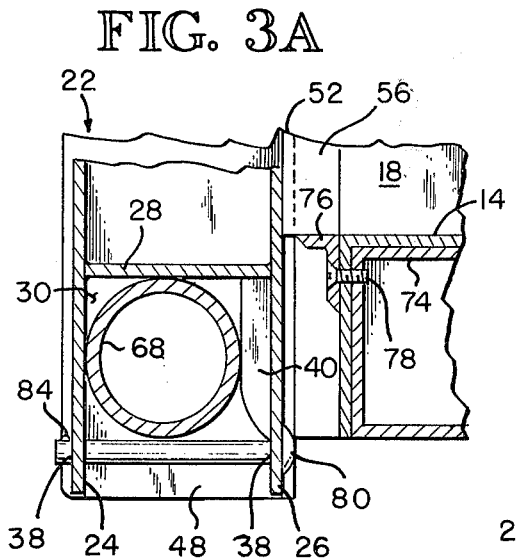
FIG. 2 is an isometric view of the unit from the underside.

The panel 22, as illustrated in FIG. 2, comprises a pair of rectangular plates 24, 26 spaced apart in parallel relationship by rectangular side pieces 28a–d. The side piece 28a along one longitudinal edge of the plates 24, 26 and one side piece 28c along one transverse edge of the plates 24, 36 are recessed, while the remaining side pieces 28b, 28d extend between the plates 24, 26 at their outer edges. The recessed portions between the plates form a longitudinal channel 30 and a transverse channel 32. The corners of the plates 24, 26 included in the channels 30, 32 contain aligned bores 34, 36, 38, and the inside edge of one plate 26 along the longitudinal chanel 30 has secured thereto several spacer blocks 40. The blocks 40 are spaced apart from each other along the length of the channel 30, but none of the blocks 40 are placed in the recessed area common to both channels 30, 32. If desired, an auxiliary panel 42 (FIG. 9) may be housed inside the hollow area between the side pieces 28a–d and telescope endwise to increase the effective length of the panel 22 beyond the width of the bed 14 when the panel functions as a ramp.

Figure 4:
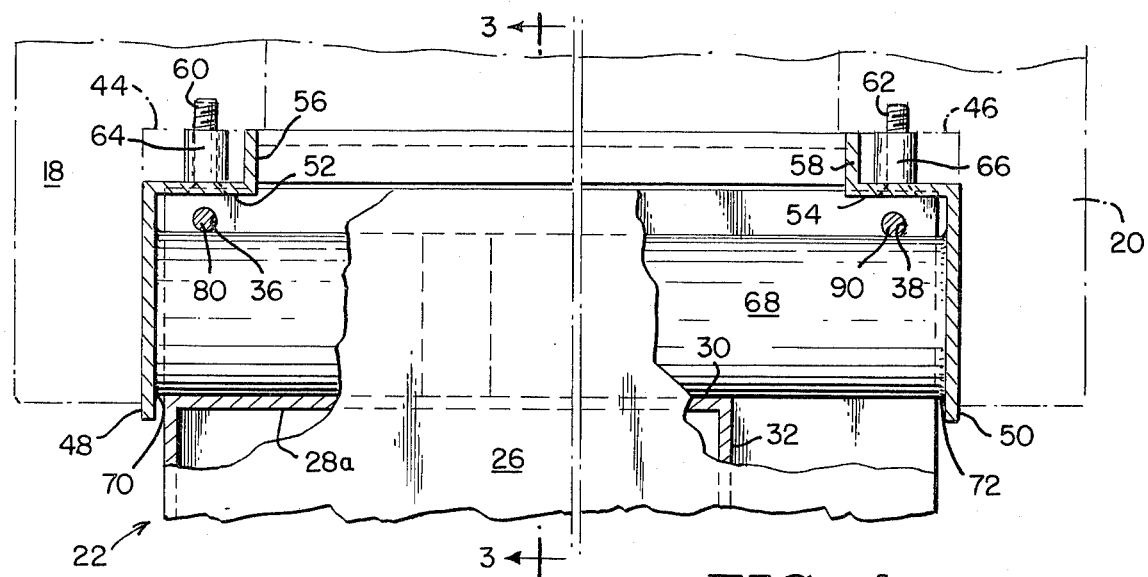
FIG. 4 is a fragmentary top plan view, partially in section, illustrating the interface between the unit and the bed of the truck when the unit is in a lowered tailgate position.

The panel 22 is secured to the truck 10 as best illustrated in FIG. 4. The sidewalls 18, 20 have formed therein at the rear end cutouts 44, 46 adapted to receive a conventional tailgate (not shown). After the conventional tailgate is removed, a support frame including a pair of longitudinal plates 48, 50 is secured to the truck in contact with the inside faces of the cutouts 44, 46. The longitudinal plates 48, 50 have inside ends which integrally form transverse legs 52, 54 and longitudinal legs 56, 58. The plates 48, 50 are fastened to the sidewalls 18, 20 by bolts 60, 62 which extend through bores (not shown) in the transverse legs 52, 54 and spacers 64, 66. The spacers 64, 66 have a length equal to that of the longitudinal legs 56, 58 to securely maintain the longitudinal plates 48, 50 a predetermined distace behind the bed 14. A pivot bar 68 is welded to the inside faces of the plates 48, 50 at either end along its perimeter 70, 72. The plates 24, 26 extend to the transverse legs 52, 54 so that the longitudinal channel 30 completely encloses the pivot bar 68 and so that the bores 36, 38 are forward of the pivot bar 68. Although the frame is illustrated here as interfacing with a vehicle having tailgate-receiving cutouts, it is understood that the frame may be modified to adapt to other structures. Furthermore, where the inventive tailgate and loading ramp combination is to be installed as original equipment, the bar 68 may be fastened directly to the sidewalls 18, 20, and an adapter frame is not required.

Figures 3A, 3B:
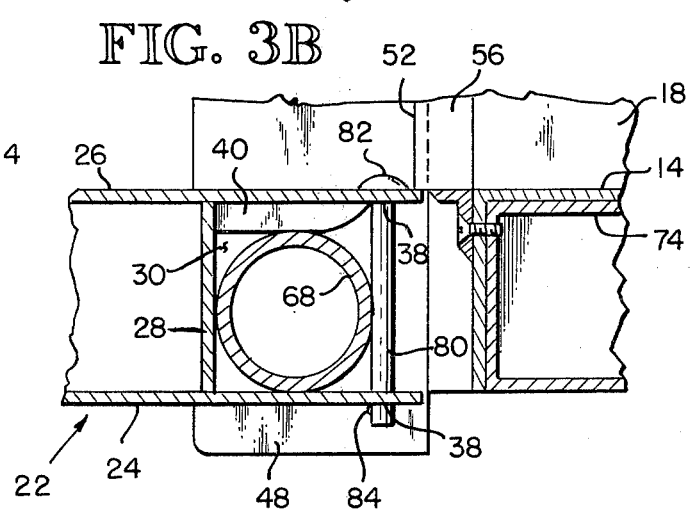
FIGS. 3A and 3B are fragmentary cross-sectional views taken along the line 3—3 of FIG. 4 showing the unit in tailgate-up and tailgate-down positions, respectively.

The interface between the panel 22 and the truck 10 is illustrated in FIGS. 3A and 3B. In FIG. 3A, the panel 22 is shown in its tailgate-up configuration, and in FIG. 3B in tailgate-down configuration. The bed 14 is supported by a frame 74. With reference to FIG. 3B, the reason for spacing the pivot bar 68 rearwardly of the bed 14 is to provide clearance between the end of the plate 26 and the bed 14 when swinging the panel 22 from the horizontal to the vertical position. An elongated bridge 76 having a top planar surface and a beveled rear end is bolted to the bed 14 and frame 74 to span the gap between the bed 14 and panel 22. The bridge 76 is desirable, but it is not necessary since the gap does not substantially interfere with the operation of the tailgate and loading ramp combination. Where the inventive device constitutes original equipment, the bed 14 can be fabricated with a rearwardly extending lip, thereby eliminating the need for a bridge. The beveled edge of the bridge 76 provides sufficient spacing from the rear end of the plate 26 as the panel is swung upwardly to its vertical position.

Referring now, also, to FIG. 4, the longitudinal plates 48, 50 extend upwardly from beneath the frame 74 to a substantial distance above the bed 14. However, the transverse legs 52, 54 and the longitudinal legs 56, 58 do not interfere with the movement of the panel 22 since the legs do not extend beneath the bed 14. As a result, the transverse legs 52, 54 do not contact the rear end of the plate 26 when the panel is swung from its horizontal to its vertical position.

When the panel is in its tailgate-up position (FIG. 3A), the panel side piece 28 rests on top of the pivot bar 68. When the panel is pivoted downwardly to its tailgate-down position (FIG. 3B), the panel 22 is supported by the pivot bar 68 through the spacers 40. The pivot bar 68 is retained in the longitudinal channel 30 by a releasable retaining pin 80 extending through the bores 38. A head 82 on one end of the pin 80 and a resilient detent 84 at the other end restrict removal of the pin 80 from the bores 38. However, since the detent 84 is resilient, the pin 80 may be removed by applying an upward force thereto when the panel is in its horizontal position.

Since the panel is horizontal in its tailgate-down position and upwardly extending in its loading ramp position, the spacing between the pivot bar 68 and the panel 22 must be adjusted if the edge of the panel 22 adjacent the bed 14 is to be at the same level as the bed 14. Furthermore, since the panel 22 in the loading ramp position is upwardly extending and the vertical position of the pivot bar 68 is fixed, the spacing means must raise the panel 22 when the panel is in the tailgate position. As illustrated in FIG. 3B, the spacers 40 raise the top plate 26 above the pivot bar 68 so that the top surface of the plate 26 is flush with the top surfaces of the bed 14 and bridge 76. When the panel 22 is placed in loading ramp configuration, the plate 26 rests directly on the pivot bar 68 since there are no spacers in the transverse channel 32. Thus, by placing the pivot bar 68 in the channel 32, the distance between the plate 26 and the pivot bar 68 is reduced. However, since the plate 26 extends upwardly toward the bed 14, the edge of the plate 26 is at the same level as the top surfaces of the bed 14 and bridge 76. In summary, the spacers 40 insure that the height of the panel is automatically adjusted to provide a smooth transition between the panel 22 and the bed 14.

Figure 6:
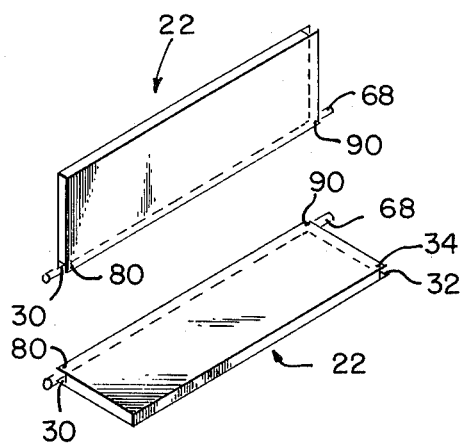
Figure 8:
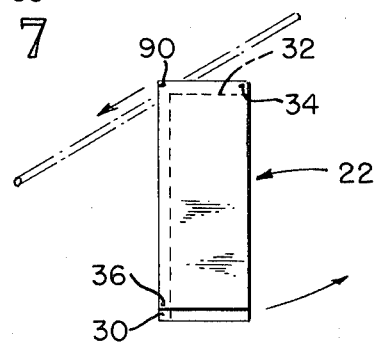
Figure 5:
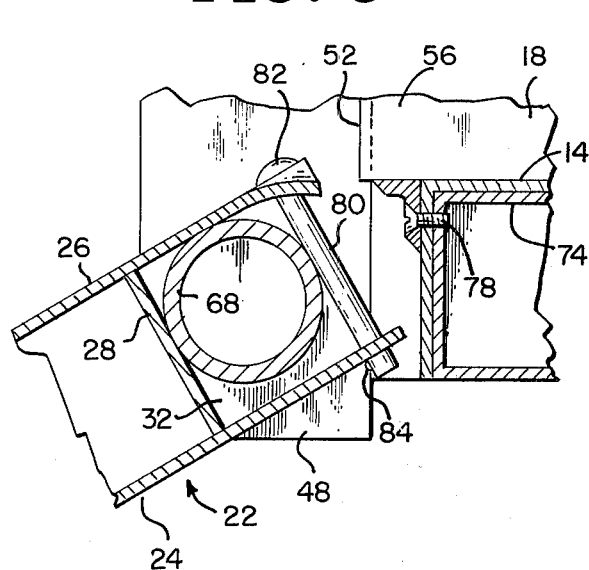
FIG. 5 is a fragmentary cross-sectional view with the unit in ramp position and taken as indicated by the line 5—5 of FIG. 1.

The operation of the device is best illustrated in FIGS. 6–8. The panel 22 is initially in its raised tailgate position, with the longitudinal channel 30 enclosing the pivot bar 68 and maintained in position by a removable pin 80 inserted in the bores 38 and a stationary pin 90 inserted through the bores 36. The panel 22 is then lowered to its tailgate-down position and the removable pin 80 is removed from the bores 38. The panel 22 is rotated about a generally vertical axis coincident with the stationary pin 90, thereby removing the pivot bar 68 from the longitudinal channel 30. As the panel 22 is rotated 90°, the stationary pin 36 is moved transversely along the pivot bar 68 until the pivot bar 68 is received in the transverse channel 32 with the panel at the approximate center of the bed 14. The removable pin 80 is then inserted through the bores 34 to hold the panel in position. In performing this operation, the panel 22 is automatically lowered with respect to the pivot bar 68 so that in both the horizontal tailgate configuration and the loading ramp configuration, there is a smooth transition between the edge of the panel 22 and the bed 14. Although the panel 22 has been described as being at the transverse center of the pivot pin 68, it is understood that the panel, in the loading ramp configuration, can be moved transversely to any desired position. If desired, both of the pins 80 and 90 can be removed and the panel 22 used as a table surface for campers.

As previously indicated, an auxiliary panel 42 may be housed in the panel 22. In that case, the end of the panel 22 corresponding to the lower end of its ramp position is left open so that the auxiliary panel 42 can be inserted into the hollow interior of the panel 22 and, when placed in the ramp position, can be telescoped outwardly to increase the effective length of the loading ramp. Means such as locking pins are provided (not shown) to prevent removal of the auxiliary panel 42 when the panel 22 is used as a tailgate. If desired, the auxiliary panel can have one of its ends formed with a channel similar in form to the channel 32 and provided with holes such as holes 34 and 36 so that the auxiliary panel can also be locked by pins with that end on the pivot bar 68 in side-by-side relation to the panel 22 so as to increase the effective ramp width thereof.

Although the present invention has been described as applied to the tailgate of a pickup truck, this is only by way of example, since the invention is also applicable to the tailgate of utility trailers and other vehicles.

The embodiments of the invention in which a particular property or privilege is claimed are detined as follows:

1. A combination tailgate and loading ramp for a truck having a substantially flat bed, said combination comprising:
   fastening means mounted closely behind the rear edge of the truck bed beneath the surface of said bed; and
   a panel having a width substantially equal to the width of said bed, said panel including releasable securing means on one longitudinal edge and one transverse edge thereof, one of said securing means pivotally connected to said fastening means at the corner of said panel common to said longitudinal and transverse edges such that said panel may be rotated between a position where said longitudinal edge is connected to said fastening means to form a tailgate enclosing the rear of said bed, and a position where said transverse edge is connected to said fastening means to form a loading ramp with said transverse edge flushly meeting the surface of said bed.

2. The combination of claim 1 wherein said fastening means comprise a pivot bar extending transversely behind the bed of said truck and wherein said truck further includes sidewalls enclosing said bed, the rear ends of said sidewalls including cutouts adapted to receive a conventional tailgate, and wherein said pivot bar is secured to said truck through a mounting frame having longitudinal plates fitting within said cutouts, said plates being secured to the sidewalls of said truck such that said pivot bar is spaced behind and beneath the rear edge of said bed, whereby said panel may enclose said pivot bar with the top surface thereof at the same level as the truck bed.

3. The combination of claim 2 wherein an interstice between said panel and said truck bed is spanned by an elongated bridge secured transversely to said truck behind said bed, said bridge having a top planar surface which flushly meets the surface of said bed.

4. The combination of claim 2 wherein said releasable securing means includes sliding means for permitting transverse movement of said panel when said panel is in loading ramp configuration.

5. The combination of claim 2 wherein said releasable securing means comprise:
   a longitudinal channel along one longitudinal edge of said panel and a transverse channel along one transverse edge of said panel, one of said channels receiving said pivot bar;
   a stationary pin extending through the corner of said panel adjacent both of said channels, said pin enclosing said pivot bar to maintain said pivot bar within the overlapping ends of said channels;
   pin receiving bores at the non-overlapping ends of said ends of said channels; and
   a removable pin inserted through the pin-receiving bore of the pivot bar-receiving channel whereby said panel is converted from tailgate to ramp and from ramp to tailgate by withdrawing said removable pin from said bore, rotating said panel about a substantially vertical axis until the other channel encloses said pivot bar, and inserting said removable pin through the remaining bore to secure to said pivot bar within said other channel.

6. The combination of claim 5 wherein one of said channels includes spacer means for adjusting the height of said panel so that the edge of said panel adjacent said bed is substantially equal in height to said bed when said panel is in lowered tailgate configuration and when said panel is in loading ramp configuration.

7. The combination of claim 6 wherein said spacer means comprise at least one spacer block secured to the upper surface of said longitudinal channel intermediate said transverse channel and the opposite end of said longitudinal channel, said block lifting said panel above the pivot bar when said panel is in lowered tailgate configuration to place the top surface of said panel substantially flush with said bed.

8. The combination of claim 2 wherein said panel further includes an inner panel telescoping out the transverse end of said panel away from said truck, thereby increasing the length of said loading ramp substantially beyond the width of said bed.

9. In a truck having a substantially flat bed and including a rectangular tailgate having a height less than its width, said tailgate being pivotally secured along the lower longitudinal edge thereof to a pivot axis adjacent the rear edge of said bed, the improvement comprising connector means for pivotally securing a corner of said tailgate at the intersection of said longitudinal edge and one transverse edge of said tailgate to said pivot axis to support said transverse edge of the tailgate closely behind and beneath the surface of said bed, said pivot axis being located behind the rear edge of said bed and at a height so that the top surface of said bed is flush with the adjacent edge of said tailgate when said tailgate is placed in loading ramp configuration, said tailgate further including spacer means along said lower edge to adjust the vertical spacing between said pivot axis and said lower edge so that when said tailgate is lowered to a horizontal plane, the top surface is flush with the top surface of said bed.

10. A method of converting a tailgate for a truck into a loading ramp, said method comprising:
   Pivotally connecting said tailgate to said truck at a point closely behind and beneath the bed of said truck in at least two spaced apart points along the lower longitudinal edge of said tailgate, one of said pivotable connections being a permanent connection adjacent one lower corner of said tailgate and the remaining connection being a releaseable connection;

removing said releasable connection;

rotating said tailgate about a substantially vertical axis coincident with said permanent connection until a transverse edge of said tailgate contacts said truck; and pivotably securing said transverse edge to said truck at a point along said transverse edge spaced apart from said permanent connection thereby forming a loading ramp having its upper edge flushly meeting the rear edge of said bed.

11. The method of claim 10, further including the step of transversely sliding said permanent connection behind said truck while performing said step of rotating said tailgate about a substantially vertical axis.

12. The method of claim 10, further including the step of adjusting the height of said tailgate adjacent said truck so that the edge of said tailgate adjacent said truck is approximately equal in height to a bed of said truck in both the lowered tailgate and loading ramp configurations.

* * * * *